US006533319B1

(12) United States Patent
Denby et al.

(10) Patent No.: US 6,533,319 B1
(45) Date of Patent: Mar. 18, 2003

(54) BALLAST ATTACHMENT FOR TRACTOR THREE-POINT HITCH

(75) Inventors: Jeffrey Gary Denby, Port Perry (CA); Daniel Robert Fuzzen, Welland (CA)

(73) Assignee: Deere & Company, Moline, IL (US)

( * ) Notice: Subject to any disclaimer, the term of this patent is extended or adjusted under 35 U.S.C. 154(b) by 307 days.

(21) Appl. No.: 09/220,170

(22) Filed: Dec. 23, 1998

(51) Int. Cl.7 .................................................. B60S 9/00
(52) U.S. Cl. ...................... 280/759; 280/758; 280/757; 414/673; 414/719; 172/439
(58) Field of Search ................ 280/759, 758, 280/757; 212/195, 196; 414/673, 719; 172/439, 440

(56) References Cited

U.S. PATENT DOCUMENTS

| | | | | |
|---|---|---|---|---|
| 3,614,135 A | * | 10/1971 | Eid | 280/491 |
| 3,888,507 A | * | 6/1975 | Berghausen | 280/150 |
| 4,094,534 A | * | 6/1978 | Welke et al. | 280/759 |
| 4,518,305 A | * | 5/1985 | Sturhmann | 414/719 |
| 4,537,423 A | * | 8/1985 | Nau et al. | 280/759 |
| 4,659,102 A | * | 4/1987 | Sturhmann et al. | 280/759 |
| 5,197,552 A | * | 3/1993 | Di Maria | 172/439 |
| 5,690,359 A | * | 11/1997 | Teich | 280/759 |

FOREIGN PATENT DOCUMENTS

AU     108534     * 10/1938

OTHER PUBLICATIONS

Deere & Company Operator's Manual, OMW43409 E4 for Model 440 Loader, cover page and p. 40–3 dated Apr. 14, 1994.
Two Photographs taken in Europe of Emily Company Ballast Box.

* cited by examiner

Primary Examiner—Brian L. Johnson
Assistant Examiner—J. Allen Shriver

(57) ABSTRACT

A ballast attachment for a tractor three-point hitch includes a cubical, rotational molded polyethylene shell filled with steel reinforced concrete. The front side of the attachment includes a forwardly opening receptacle for receiving a transverse hitch bar carried by the lower links of a tractor three-point hitch, the rear portion of the receptacle including a semi-cylindrical seat for the hitch bar. The center of gravity of the attachment causes the lower part of the attachment to tend to pivot about the hitch bar toward the tractor to the point where it engages the lower three-point hitch draft links. A chain secures the attachment in place.

15 Claims, 2 Drawing Sheets

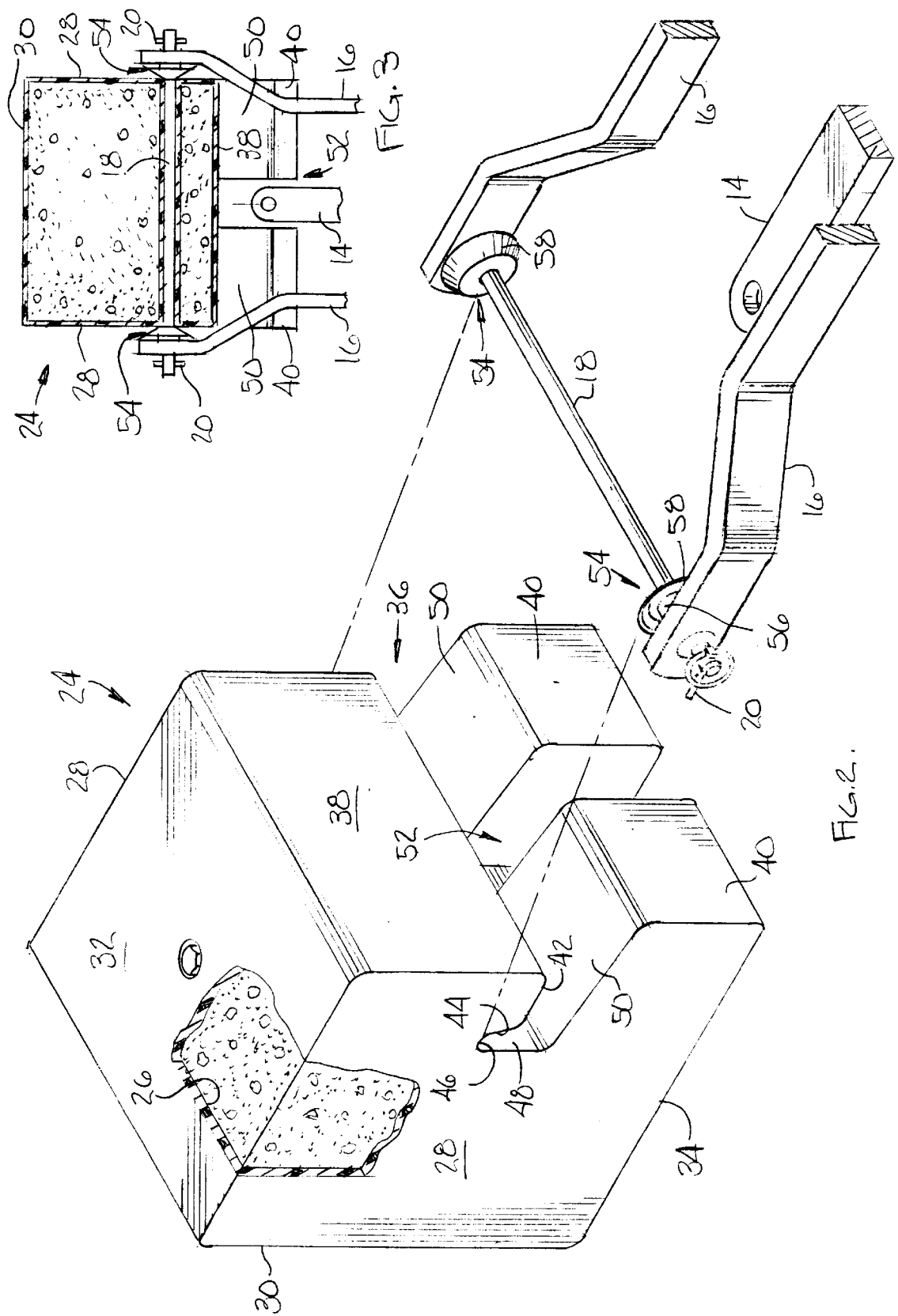

BALLAST ATTACHMENT FOR TRACTOR THREE-POINT HITCH

BACKGROUND OF THE INVENTION

The present invention relates to tractor ballast and, more specifically, relates to ballast boxes for attachment to tractor three-point hitches.

With front-mounted implements, a loader, for example, attached to a tractor, instability of the tractor, especially the rear of the tractor, can result. Instability can include front-end and sideways tipping. Counterweights, known as ballast, must be applied to the rear of the tractor in order to prevent this instability.

Currently, fluid is injected into the rear tractor tires and/or cast iron wheel weights are bolted to the rims of the rear tractor tires to achieve initial ballast. This method of adding ballast is undesirable for lawn care implements. It is also known to add further ballast by mounting a detachable ballast box implement to the tractor rear three-point hitch. A known ballast box attachment is a 610 mm x 406 mm x 508 mm steel box, which users contend is difficult to move or attach or detach from the three-point hitch when filled with sand or cement, as is the practice. This box has the further drawback of protruding farther rearward and upward than is desired, thus decreasing the amount of stability provided to the tractor.

SUMMARY OF THE INVENTION

According to the present invention, there is provided an improved ballast attachment for mounting to a tractor three-point hitch.

An object of the invention is to provide a three-point hitch ballast attachment which is easy to attach to, and detach from, the three-point hitch and which provides good stability.

A more specific object of the invention is to provide a three-point hitch ballast attachment which is formed in one major piece including a hitch bar receptacle located on its forward side for receiving a transverse bar mounted between rear ends of the three-point hitch lower arms, the bar acting to elevate and support the ballast attachment in an operative position when the arms are raised after the bar is received in the receptacle.

Yet a more specific object is to provide a ballast attachment, as set forth in the immediately preceding object, wherein conical centering or guide plates are mounted at the opposite ends of the transverse bar at locations inwardly of the opposite ends of the lower hitch arms for engaging opposite ends of the receptacle of the ballast attachment.

These and other objects of the invention will become apparent from a reading of the ensuing description together with the appended drawings.

BRIEF DESCRIPTION OF THE DRAWINGS

FIG. 2 is a right front perspective view of the ballast attachment together with a portion of the tractor draft links and drawbar.

FIG. 3 is a horizontal sectional view showing the ballast attachment taken through its connection with the tractor draft links.

DESCRIPTION OF THE PREFERRED EMBODIMENT

Figure 1:
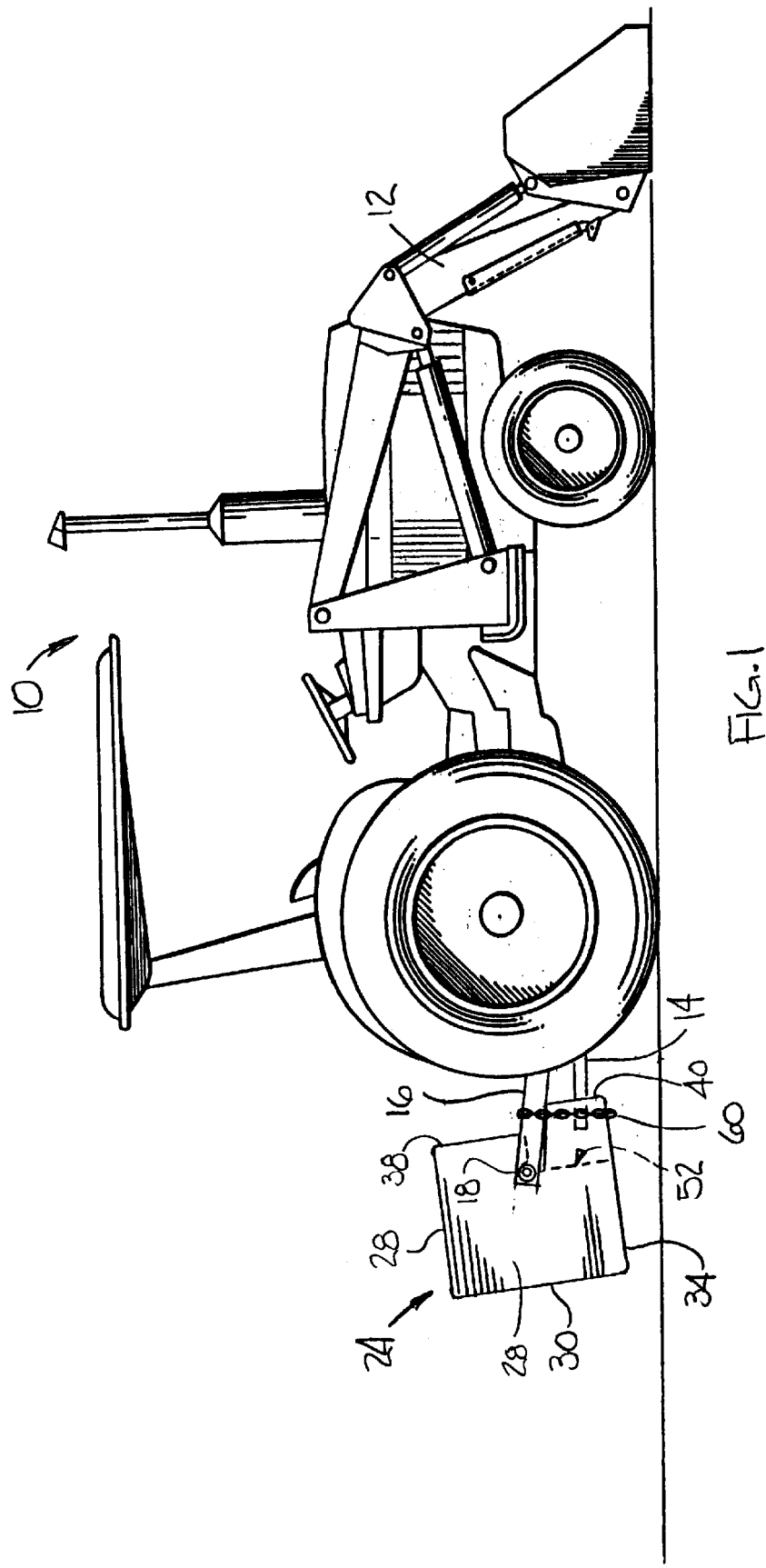
FIG. 1 is a right side elevational view showing a ballast attachment, constructed in accordance with the present invention, connected to the three-point hitch of a tractor to which is attached a front-mounted loader.

Referring now to FIG. 1, there is shown a tractor 10 equipped with a front-mounted loader 12. Provided at the rear of the tractor is a centrally located drawbar 14 and a three-point hitch, of which only the lower pair of draft arms or links 16 are shown since they are the only part of the hitch that is employed with the present invention.

Referring now also to FIGS. 2 and 3, it can be seen that extending between the draft links 16 and received in transverse bores provided in the draft links 16 is a ballast attachment hitch bar 18 that is in the form of a cylindrical rod held in place by a pair of lynch pins 20 respectively received in holes provided at opposite ends of the bar 18, at locations outwardly of the draft links 16. A ballast attachment 24 is shown supported in a raised working position by the draft links 16 and hitch bar 18.

Referring now also to FIG. 2, it can be seen that the ballast attachment 24 is a one-piece structure which is in a substantially cubical or block shape. The attachment 24 has an outer shell 26, preferably formed by a rotational mold process from a medium density polyethylene material. The polyethylene shell 26 is filled with a ballast material, which, in the preferred embodiment, is concrete reinforced with steel and has a density of about 150 lb/ft$^3$. The ballast attachment 24 includes right- and left-hand vertical side walls 28 and a rear vertical wall 30 joined by horizontal top and bottom walls 32 and 34, respectively.

A forwardly opening hitch bar receptacle 36 is formed in and extends transversely across the entire front of the ballast attachment 24. In order to provide clearance for structure (not shown) at the rear of the tractor 10, an upper front portion of the ballast attachment 24 is defined by an upper vertical front wall section 38 which is set back from a vertical front wall section 40 of a lower front portion of the ballast attachment that is in vertically spaced relationship to the upper front portion. An upper wall of the receptacle 36 is defined in part by a horizontal surface portion 42 that extends rearwardly at a bottom end of the upper front wall section 38 the upper wall of the receptacle 26 further including an upwardly and rearwardly inclined surface portion 44 that terminates at a substantially semi-cylindrical hitch bar seat 46. Additionally, the receptacle 36 includes a vertical rear surface portion 48 which extends between the seat 46 and a rearward end of a lower surface portion 50 that is inclined downwardly and forwardly from the rear surface portion 48 to a top of the lower front wall section 40. It is significant that the seat 46 of the receptacle 36 is located over one third (approximately 38%) of the distance from the front to the rear of the ballast attachment 24. This placement of the seat 46 results in the attachment 24 being positioned in close proximity to the rear of the tractor 10. Located centrally between opposite sides of the lower bottom portion of the attachment 24 is a drawbar clearance slot 52 that extends rearwardly from the front wall section 40 to the receptacle rear surface portion 48.

Referring now to FIG. 3, it can be seen that spaced inwardly from opposite ends of and pinned to the hitch bar 18 are respective centering guides 54. The centering guides 54 each include a central blushing section 56 received on the rod and containing a hole aligned with a hole in the rod, with the aligned holes receiving the retaining pin. Joined to and extending outwardly from an inner end of the blushing section 56 is a conical guide plate 58 arranged so that its smaller end faces inwardly. Thus, opposed surfaces of the guide plates 58 act to guide the hitch bar 18 into the ballast attachment receptacle 36 during mounting of the attachment to the three-point hitch lower links 16.

It is to be noted that the hitch rod receptacle 36 is so dimensioned and located within the ballast attachment 24 that raising of the three-point hitch links 16, after the hitch bar 18 is located in the rear of the receptacle 36, will result in the rod first becoming engaged with the receptacle seat 46, and then, due to the location of the center of gravity of the attachment 24, in the attachment rotating counterclockwise about the bar 18, as viewed in FIG. 1. Because the rear ends of the lower draft links 16 are offset outwardly from the remainder of the links, pivoting of the attachment 24 will be limited by the links when the attachment surfaces 50 engage the bottoms of the draft links 16. A chain 60, or other securing element, is used to secure the attachment 24 in place against the draft links 16.

What is claimed is:

1. In a ballast attachment adapted for being attached to a three point hitch and having opposite transversely spaced sides joined to front, rear and bottom sides, the improvement comprising: said ballast attachment including a hitch bar receptacle opening at and extending entirely across said front side of said ballast attachment, said receptacle including, and an upper rear location thereof, a downwardly facing horizontal seat adapted for receiving a hitch bar extending between lower draft links of said three-point hitch, said ballast attachment including spaced apart upper and lower forward parts, with a lower surface of said upper forward part defining an upper surface of said receptacle and with an upper surface of said lower forward part defining a lower surface of said receptacle; and said lower forward part being provided with a drawbar clearance slot located centrally between opposite sides of said lower forward part and extending a full height dimension of said lower forward part.

2. The ballast attachment defined in claim 1 wherein said upper forward part is offset rearwardly relative to said lower forward part.

3. The ballast attachment defined in claim 2 wherein said upper surface of said lower forward part is inclined upwardly and rearwardly from a front surface of said lower forward part to a location below said horizontal seat; and said lower surface of said upper forward part, and then upwardly to said horizontal seat.

4. The ballast attachment defined in claim 2 wherein said upper and lower forward parts respectively include upper and lower vertical front wall sections.

5. The ballast attachment defined in claim 1 wherein said transverse horizontal seat is so located relative to a center of gravity of said ballast attachment that said ballast attachment, when lifted from a horizontal surface by a transverse hitch bar located in said seat and carried by lower draft links of said three-point hitch, will tend to pivot about said bar such that said lower portion moves toward a tractor carrying said three-point hitch.

6. In a combination of a three-point hitch including a pair of lower draft links having a cylindrical hitch bar extending between respective locations near rear ends of the draft links, and a ballast attachment secured to said links, the improvement comprising: said ballast attachment having a width just slightly less than the distance between rear end locations of said draft links and being a substantially cubical one-piece structure having top, bottom, right-hand, left-hand, front and rear sides; said front side being provided with a forwardly opening hitch bar receptacle extending rearwardly from and entirely across said front side and terminating at a downwardly facing seat elevated from the remainder of said receptacle and being shaped complementary to and receiving said hitch bar.

7. The combination defined in claim 6 wherein a pair of centering guides are respectively fixed to spaced apart locations of said hitch bar adjacent inner sides of said draft links, said guides having respective surfaces shaped for guiding said draft links for passing on opposite sides of said ballast attachment during placement of said hitch bar into said seat.

8. The combination defined in claim 6 wherein said receptacle as a lower surface which is inclined upwardly from front to rear and terminates at a location vertically below said seat.

9. The combination defined in claim 6 wherein said tractor includes a drawbar located below and centered relative to said draft links; and said ballast attachment having a centrally located, fore-and-aft extending clearance notch provided in a central lower location thereof for permitting passage of said drawbar when the ballast attachment is raised and lowered relative to said drawbar by raising and lowering said draft links.

10. The combination defined in claim 6 wherein said seat is located forwardly of a center of gravity of said attachment so that the bottom of said attachment pivots about said hitch bar towards said tractor when the ballast attachment is raised from the ground by operation of said three-point hitch.

11. The combination defined in claim 10 wherein said draft links include forward portions spaced closer together than said respective locations near rear ends of the draft links; said forward positions being positioned for being contacted by said ballast attachment when said ballast attachment has pivoted a predetermined amount about said hitch bar.

12. The combination defined in claim 11 and further including a flexible element extending about said ballast attachment from one draft link to the other draft link so as to hold the ballast attachment in engagement with said draft links.

13. The combination defined in claim 6 wherein said ballast attachment has an upper forward portion which is set back relative to a lower forward portion of said ballast attachment.

14. The ballast attachment defined in claim 1 wherein said ballast attachment is encased in a plastic material.

15. The ballast attachment defined in claim 6 wherein said ballast attachment is encased in a plastic material.

* * * * *